United States Patent
Fordham et al.

(10) Patent No.: US 9,651,360 B1
(45) Date of Patent: May 16, 2017

(54) OPTICAL METHODS FOR DETERMINING POSITIONS OF OPTICAL DISCS IN TIGHTLY PACKED CYLINDRICAL ARRAYS

(71) Applicant: Flextronics AP, LLC., Broomfield, CO (US)

(72) Inventors: Mark Fordham, Chapel Hill, NC (US); Stephen Hancock, Wake Forest, NC (US)

(73) Assignee: Flextronics AP, LLC, Broomfield, CO (US)

(*) Notice: Subject to any disclaimer, the term of this patent is extended or adjusted under 35 U.S.C. 154(b) by 0 days.

(21) Appl. No.: 14/919,619

(22) Filed: Oct. 21, 2015

Related U.S. Application Data (60) Provisional application No. 62/066,752, filed on Oct. 21, 2014.

(51) Int. Cl.
*G01B 11/00* (2006.01)
*B25J 11/00* (2006.01)

(52) U.S. Cl.
CPC ........... *G01B 11/00* (2013.01); *B25J 11/0095* (2013.01); *Y10S 901/47* (2013.01)

(58) Field of Classification Search
CPC ...... G01B 11/00; B25J 11/0095; Y10S 901/47
USPC ........ 356/139.01–139.1, 338, 341, 432, 600, 356/614
See application file for complete search history.

(56) References Cited

U.S. PATENT DOCUMENTS

| | | |
|---|---|---|
| 4,557,382 A | 12/1985 | Johnson |
| 4,588,086 A | 5/1986 | Coe |
| 4,702,369 A | 10/1987 | Philosophe |
| 4,712,679 A | 12/1987 | Lowe |
| 4,747,488 A | 5/1988 | Kikuchi |
| 4,779,732 A | 10/1988 | Boehm |
| 4,850,477 A | 7/1989 | Gelardi |
| RE33,361 E | 10/1990 | Coe |
| 5,046,615 A | 9/1991 | Nentl |
| 5,105,407 A * | 4/1992 | Ishika .................. G11B 7/0916 369/44.37 |
| D335,215 S | 5/1993 | Stumpff |
| 5,428,595 A * | 6/1995 | Yoshida ............... G11B 7/1353 369/112.04 |
| 5,474,170 A | 12/1995 | Erickson |
| 5,485,436 A | 1/1996 | Forget |
| 5,508,994 A | 4/1996 | Nakamichi |
| 5,528,442 A | 6/1996 | Hisatomi |
| 5,548,567 A | 8/1996 | Sawai |
| 5,704,494 A | 1/1998 | Nishikiori |
| 5,706,946 A | 1/1998 | Kakizaki |

(Continued)

*Primary Examiner* — Jeanette E Chapman
(74) *Attorney, Agent, or Firm* — Haverstock & Owens LLP (57) ABSTRACT

A cylindrical array of tightly spaced optical discs is arranged such that all optical discs in the array share the same axis of symmetry. An optical system is aligned with the optical disc array. The optical system includes a light source, such as a diffuse reflector, and a photo detector, such as a photo detector. The photo detector is aligned to receive either light transmitted through the optical disc array or light reflected off the optical disc array. Illumination directed at the optical disc array results in a pattern of alternating light and dark illuminations, or bands. The photo detector focusing on the cylinder surfaces of the optical discs detects the light/dark transitions and thus enables counting of discrete optical discs.

15 Claims, 7 Drawing Sheets

(56) References Cited

U.S. PATENT DOCUMENTS

| | | | |
|---|---|---|---|
| 5,708,634 A * | 1/1998 | Alon | G11B 7/0909 250/201.5 |
| 5,765,707 A | 6/1998 | Kenevan | |
| 5,793,717 A | 8/1998 | Morita | |
| 5,808,976 A | 9/1998 | Hisatomi | |
| 5,823,332 A | 10/1998 | Clausen | |
| 5,921,397 A | 7/1999 | Whalen | |
| 5,959,958 A | 9/1999 | Inatani | |
| 6,028,833 A * | 2/2000 | Maeda | G11B 7/005 369/47.5 |
| 6,134,212 A | 10/2000 | Pines | |
| 6,371,321 B1 | 4/2002 | Lee | |
| 7,431,158 B2 | 10/2008 | Yamada | |
| 7,609,469 B2 * | 10/2009 | Gage | B82Y 10/00 360/51 |
| 7,743,938 B2 | 6/2010 | Wu | |
| 2002/0034147 A1 * | 3/2002 | Lee | G11B 7/14 369/112.24 |
| 2006/0182000 A1 * | 8/2006 | McNiece | G02B 5/1876 369/112.1 |
| 2006/0239173 A1 * | 10/2006 | Zhang | G11B 7/09 369/124.12 |
| 2007/0146715 A1 * | 6/2007 | Potyrailo | G01N 21/5907 356/432 |
| 2007/0201320 A1 | 8/2007 | Suzuki | |
| 2007/0251896 A1 | 11/2007 | Lau | |
| 2011/0119693 A1 | 5/2011 | Takasawa | |
| 2012/0062784 A1 * | 3/2012 | Van Heugten | H04N 5/2258 348/340 |
| 2015/0194180 A1 | 7/2015 | Morioka | |

* cited by examiner

OPTICAL METHODS FOR DETERMINING POSITIONS OF OPTICAL DISCS IN TIGHTLY PACKED CYLINDRICAL ARRAYS

CROSS-REFERENCE TO RELATED APPLICATION(S)

This application claims priority under 35 U.S.C. §119(e) of the U.S. Provisional Patent Application Ser. No. 62/066,752, filed Oct. 21, 2014 and titled, "OPTICAL METHODS FOR DETERMINING POSITIONS OF OPTICAL DISCS IN TIGHTLY PACKED CYLINDRICAL ARRAYS," which is hereby incorporated by reference in its entirety for all purposes.

FIELD OF THE INVENTION

The present invention relates to the field of optical disc storage and access. More specifically, the present invention relates to a system and method of determining positions of optical discs in tightly packed cylindrical arrays.

BACKGROUND OF THE INVENTION

Optical discs provide a reliable long term storage medium available for digital information. In order to automate archived optical disc storage in a cost effective manner, optical discs are shelved for occasional automated retrieval. It is desired to minimize the amount of space that the optical discs themselves occupy so as to maximize optical disc storage density. As such, optical discs are stacked as closely together as possible. A problem with closely stacking optical discs is the subsequent process of accessing a specific optical disc within a tightly spaced optical disc stack. One technique of accessing a specific optical disc within an optical disc stack is to use a robotic gripper. The specific optical disc is accessed by moving the robotic gripper a determined distance within the optical disc stack based on an anticipated average thickness of each optical disc. However, variances in manufacturing tolerances for optical disc thicknesses results in inaccurate determination of a specific optical disc position within an optical disc stack.

SUMMARY OF THE INVENTION

A cylindrical array of tightly spaced optical discs is arranged such that all optical discs in the array share the same axis of symmetry. An optical system is aligned with the optical disc array. The optical system includes a light source, such as a diffuse reflector, and a photo detector, such as a photo detector. The photo detector is aligned to receive either light transmitted through the optical disc array or light reflected off the optical disc array. Illumination directed at the optical disc array results in a pattern of alternating light and dark illuminations, or bands. The photo detector focusing on the cylinder surfaces of the optical discs detects the light/dark transitions and thus enables counting of discrete optical discs.

In an aspect, an optical disc retrieval system is disclosed. The system includes an array of optical discs, a light source, a photo detector and a processor. The array of optical discs has a central axis. The light source is configured to direct light toward the array of optical discs. The photo detector is aligned with the light source to detect light having impinged the array of optical discs and to output a corresponding detected signal. The light source and the photo detector are configured to move together parallel to the central axis while directing light toward the array of optical discs and detecting light such that the detected signal comprises a series of alternating high intensity value bands and low intensity value bands. Each high intensity value band corresponds to a location of an optical disc in the array and each low intensity value band corresponds to a gap between adjacent optical discs in the array. The processor is coupled to the photo detector to receive the detected signal. The processor is configured to count the high intensity value bands to determine a location of a specific optical disc within the array of optical discs. In some embodiments, the system also includes a movement mechanism coupled to both the light source and the photo detector, wherein the movement mechanism is configured to move the together in tandem. In some embodiments, the system also includes one or more optical elements positioned between the light source and the array of optical discs, wherein the one or more optical elements are configured to focus light output from the light source onto the array of optical discs. In some embodiments, the system also includes one or more optical elements positioned between the array of optical discs and the photo detector, wherein the one or more optical elements are configured to focus light having impinged the array of optical discs onto the photo detector. In some embodiments, the one or more optical elements comprise a slit aperture. In some embodiments, the photo detector is positioned relative to the light source such that at least a portion of the array of optical discs is positioned between the light source and the photo detector. In some embodiments, the light directed toward the array of optical discs is transmitted through the array of optical discs and the transmitted light is detected by the photo detector. In some embodiments, transmitted light that passes through an optical disc in the array is detected as the high intensity value band, and transmitted light that passes through a gap between adjacent optical discs in the array is detected as the low intensity value band. In some embodiments, the photo detector is positioned relative to the light source and the array of optical discs such that reflected light resulting from light directed toward the array of optical discs impinging the optical discs in the array is detected by the photo detector. In some embodiments, reflected light that reflects off an optical disc in the array is detected as the high intensity value band, and light directed toward the array of optical discs that passes through a gap in adjacent optical discs in the array is not reflected and is indicated as the low intensity value band detected by the photo detector. In some embodiments, the light source comprises an axis of symmetry, further wherein the photo detector is aligned with the axis of symmetry of the light source. In some embodiments, the light source comprises an axis of symmetry, further wherein the photo detector is aligned off the axis of symmetry of the light source. In some embodiments, the system also includes a tray configured to store the array of optical discs, wherein the array of optical disc are stored in the tray on edge such that the central axis of the array forms a horizontal axis. In some embodiments, the system also includes a compression mechanism coupled to the tray, wherein the compression mechanism is configured to compress the array of optical discs stored in the tray. In some embodiments, the system also includes a robotic gripper configured to selectively grab the specific optical disc.

In another aspect, a method of retrieving specific optical disc within an array of optical discs is disclosed. The method includes directing a light from a light source toward the array of optical discs and scanning the light along a length of the array of optical discs. The method also includes detecting light having impinged the array of optical discs and generating a corresponding signal. The signal comprises a series of alternating high intensity value bands and low intensity value bands, each high intensity value band corresponding to a location of an optical disc in the array and each low intensity value band corresponding to a gap between adjacent optical discs in the array. The method also includes counting the high intensity value bands to determine a location of the specific optical disc within the array of optical discs. In some embodiments, the scanned light is transmitted through the array of optical discs, and transmitted light that passes through an optical disc in the array is detected as the high intensity value band and transmitted light that passes through a gap between adjacent optical discs in the array is detected as the low intensity value band. In some embodiments, a portion of the scanned light is reflected off the optical discs in the array, and reflected light off an optical disc in the array is detected as the high intensity value band and scanned light directed toward the array of optical discs that passes through a gap in adjacent optical discs in the array is not reflected and is indicated as the low intensity value band detected.

Other features and advantages of the present invention will become apparent after reviewing the detailed description of the embodiments set forth below.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a method and system for determining positions of optical discs in tightly packed cylindrical arrays. Those of ordinary skill in the art will realize that the following detailed description of the method and system is illustrative only and is not intended to be in any way limiting. Other embodiments of the method and system will readily suggest themselves to such skilled persons having the benefit of this disclosure.

Reference will now be made in detail to implementations of the method and system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Automated retrieval of a specific individual optical disc within a tightly spaced array of optical discs requires distinguishing individual optical discs in the optical disc array. Embodiments are directed to systems and methods for determining positions of individual optical discs for retrieval. In some embodiments, the optical discs in the optical disc array are tightly spaced, yet a small gap is still present at the perimeter between each adjacent optical disc in the optical disc array. Such a configuration is common for those types of optical discs that are configured with a center portion having a larger thickness than a perimeter portion. When such optical discs are stacked together, the center portions of adjacent optical discs contact each other, but the thinner perimeter portions remain slightly separated. Light is scanned onto the optical disc array and a photo detector detects high and low intensity signals and their corresponding locations. The high intensity signals correspond to the thickness of an individual optical disc while the low intensity signals correspond to the gap between individual optical discs. The light source and corresponding photo detector pair detect reflections (or transmissions) off (or through) the cylindrical array of optical discs or the absence thereof. A threshold detector determines when the amplitude of the reflected (or transmitted) signal indicates the presence or absence of an optical disc in the light path between the light source and the photo detector. The threshold detector and a counter enable an optical scan to locate an exact position of a specific optical disc in the array of tightly spaced optical discs.

In another embodiment, the optical discs in the cylindrical array are tightly spaced, and there is substantially no space between adjacent optical discs in the optical disc array. The light source illuminates the compressed array of optical discs and the photo detector detects the outer surface of the compressed, or touching, cylindrical optical disc array. Individual interfaces between optical discs are less efficient at transmitting the diffused light than the internal region of individual optical discs. The photo detector detects high and low intensity signals and their corresponding locations, where the high intensity signals correspond to the thickness of an individual optical disc and the low intensity signals correspond to the boundary between individual optical discs. The threshold detector and the counter enable determination of the transitions between low and high intensity signal regions to determine the transition from one optical disc to the next and thus determine a specific optical disc location in an array of optical discs compressed together.

Figure 1:
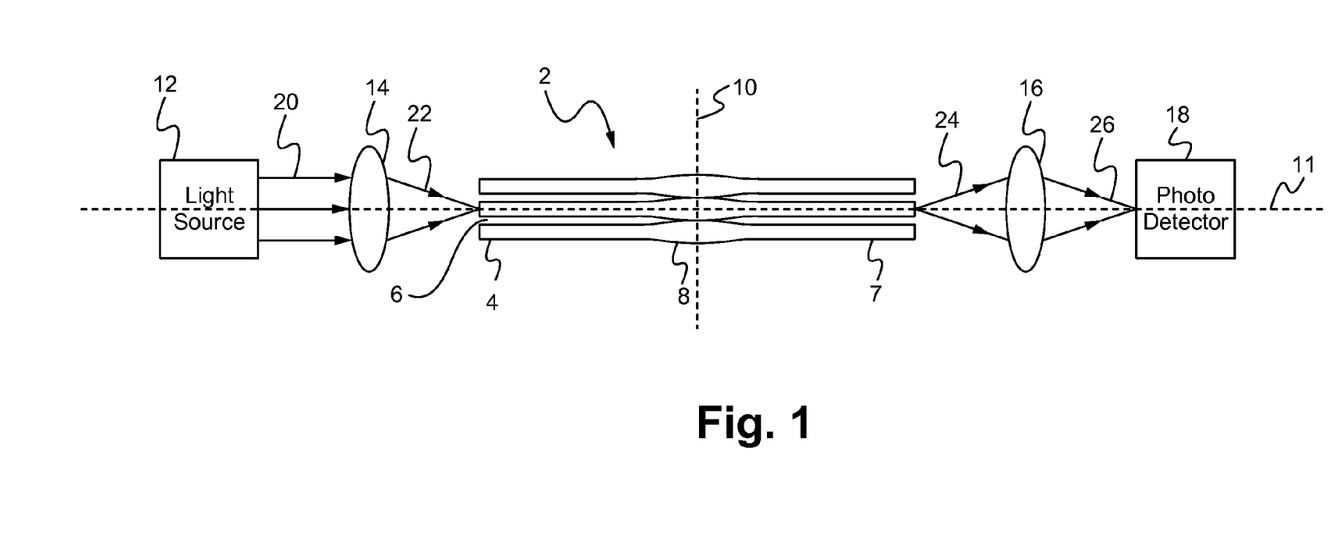
FIG. 1 illustrates a conceptual diagram of a system using a transmission option for determining positions of optical discs in an optical disc array according to some embodiments.

Optical scanning along the length of the optical disc array results in a detected pattern of alternating light and dark bands representing the high intensity signals and low intensity signals, respectively. The light and dark bands can be observed using a reflective option or a transmission option. In the transmission option, the photo detector is aligned with the light source but with a portion of the optical disc array positioned between the two. The light emitted by the light source is transmitted through the optical disc array arriving at the photo detector. FIG. 1 illustrates a conceptual diagram of a system using a transmission option for determining positions of optical discs in an optical disc array according to some embodiments. The system includes a light source 12, source-side optics 14, an optical disc array 2, detector-side optics 16 and a photo detector 18. In some embodiments, the light source 12 is an LED light source. In other embodiments, the light source 12 is a laser light source. It is understood that other types of light sources can be used. The optical disc array 2 includes a plurality of optical discs 4 stacked along a cylindrical axis 10. In some embodiments, the optical discs 4 are each configured with a center portion 8 that is slightly thicker than a perimeter portion 7. In such a case, when the optical discs 4 are tightly stacked or compressed together, the center portions 8 of adjacent optical discs 4 contact each other, but a gap 6 remains between adjacent optical discs 4 due to the smaller thickness of the perimeter portions 7.

The light source 12 emits light 20 which is received by the source-side optics 14 and directed as light 22 onto the optical disc array 2. In some embodiments, the source-side optics 14 focus the received light 20 as focused light 22, such as a narrow line of light that is parallel to a diameter of each optical disc 4. In other embodiments, the light from the light source does not need to be focused, there can be broad illumination of the optical disc array. Although source-side optics 14 are shown in FIG. 1 as a single component, it is understood that the source-side optics 14 can include multiple optical components. As described in greater detail below in regard to FIG. 6, the light source 12 and the source-side optics 14 are configured to move parallel to the cylindrical axis 10 thereby scanning the light 22 along a length of the optical disc array 2. The light 22 impinges either an optical disc 4 or a gap 6 depending on the scanning location as the light source 12 and source-side optics 14 are moved. The impinging light 22 is transmitted through a width of the optical disc array 2 toward the detector-side optics 16 and the photo detector 18.

The photo detector 18 and the detector-side optics 16 are aligned to receive the transmitted light 24 leaving the optical disc array 2. The detector-side optics 16 focus the received light 24 as focused light 26 and directs the focused light 26 to the photo detector 18. Although detector-side optics 16 are shown in FIG. 1 as a single component, it is understood that the detector-side optics 16 can include multiple optical components. In some embodiments, the optical train includes a slit aperture for limiting light impinging the photo detector 18. In this case, the optical elements focus the light directed from the light source to the optical disc array as a focused line, and an orientation of the slit in the slit detector is aligned to match an angle of the focused line. In particular, the focused line is oriented to be parallel to the faces of the optical discs and the slit in the slit detector is also oriented to be parallel to the faces of the optical discs. In this manner, the slit aperture allows differentiation of narrow low and wide high irradiance regions thereby maximizing sensitivity to the narrow dark bands in the pattern corresponding to gaps between optical discs.

Figure 3:
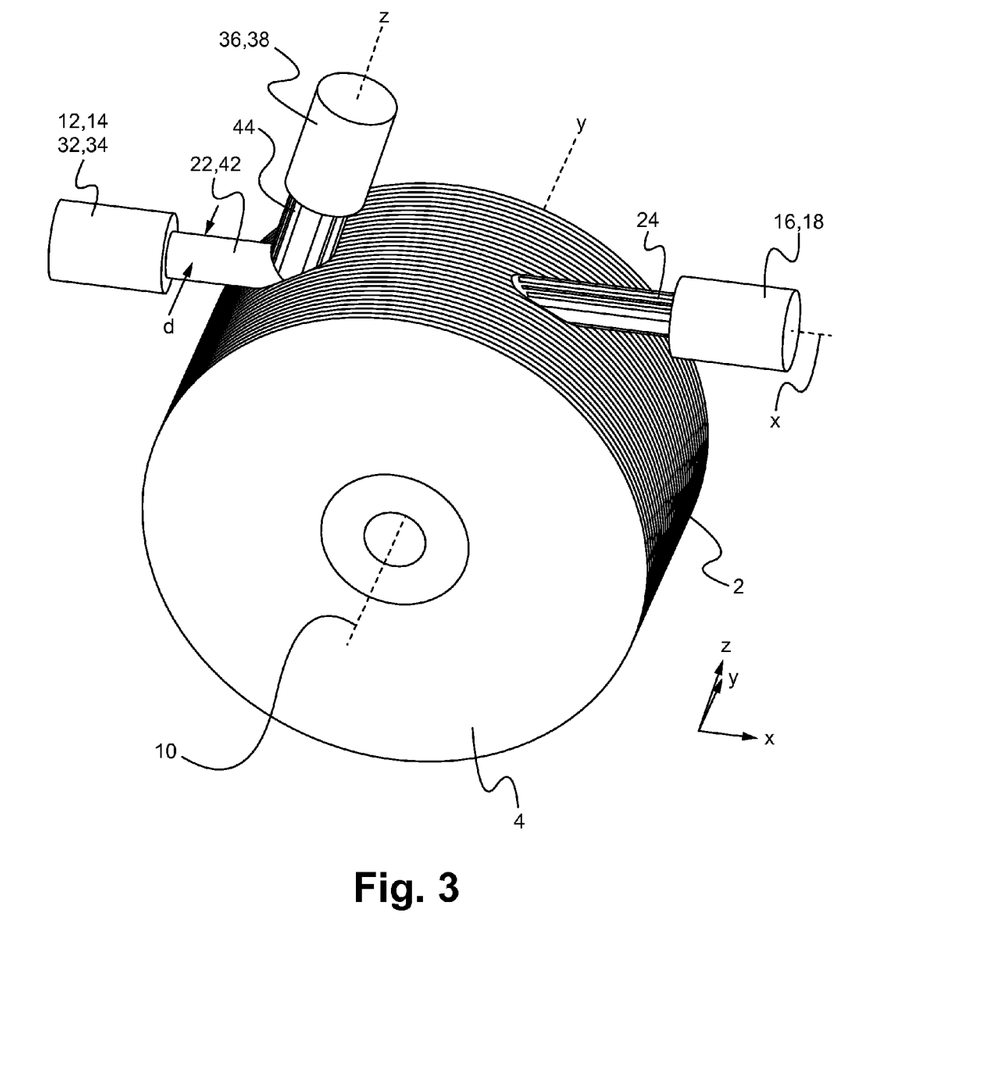
FIG. 3 illustrates an exemplary configuration of the light source and photo detector for both the transmission option and the reflective option.

In some embodiments, the light emitted from the light source 12 is focused onto the optical disc array 2 and scanned across the length of the optical disc array (parallel to the cylindrical axis 10) by simultaneously moving the light source 12/photo detector 18 pair, along with the corresponding optics 14, 16, parallel to the cylindrical axis 10. In some embodiments, the light source 12, the source-side optics 14, the detector-side optics 16 and photo detector 18 are aligned along an optical axis 11. The optical axis 11 is perpendicular to the cylindrical axis 10 of the optical disc array 2. However, the optical axis 11 is offset from the cylindrical axis such that the optical axis does not intersect the cylindrical axis 10. In this manner, the light transmitted through the optical disc array 2 does not pass through the center portions 8 of the optical discs 4. Such a configuration is illustrated in FIG. 3.

Each optical disc 4 functions as a waveguide for impinging light. In the case where there are gaps between adjacent optical discs in the array, the gaps between adjacent optical discs also function as waveguides. Total internal reflection within the body of the optical disc accounts for more efficient transmission of visible light through the optical discs relative to transmission of visible light in the air gap between the optical discs. This results in a pattern of light and dark bands of light detected by the photo detector, where each light band of the pattern corresponds to an optical disc and each dark band of the pattern corresponds to an air gap between optical discs. In tightly spaced arrays, the dark band of the pattern is narrower than the light band of the pattern, since a distance at the perimeter between adjacent optical discs in the optical disc array is smaller than a thickness of the optical discs.

In other embodiments, the optical discs are configured to have substantially constant thickness such that a center portion thickness and a perimeter portion thickness are substantially the same. In such a case, adjacent optical discs in a stacked array substantially contact each other over their entire flat surfaces. Similar to the configuration with gaps between adjacent optical discs, the contacting surfaces of adjacent optical discs also function as a waveguide, but again with less efficient transmission of visible light than that of visible light transmitted through the optical disc itself. This again manifests itself as a pattern of light and dark bands detected by the photo detector.

Figure 2:
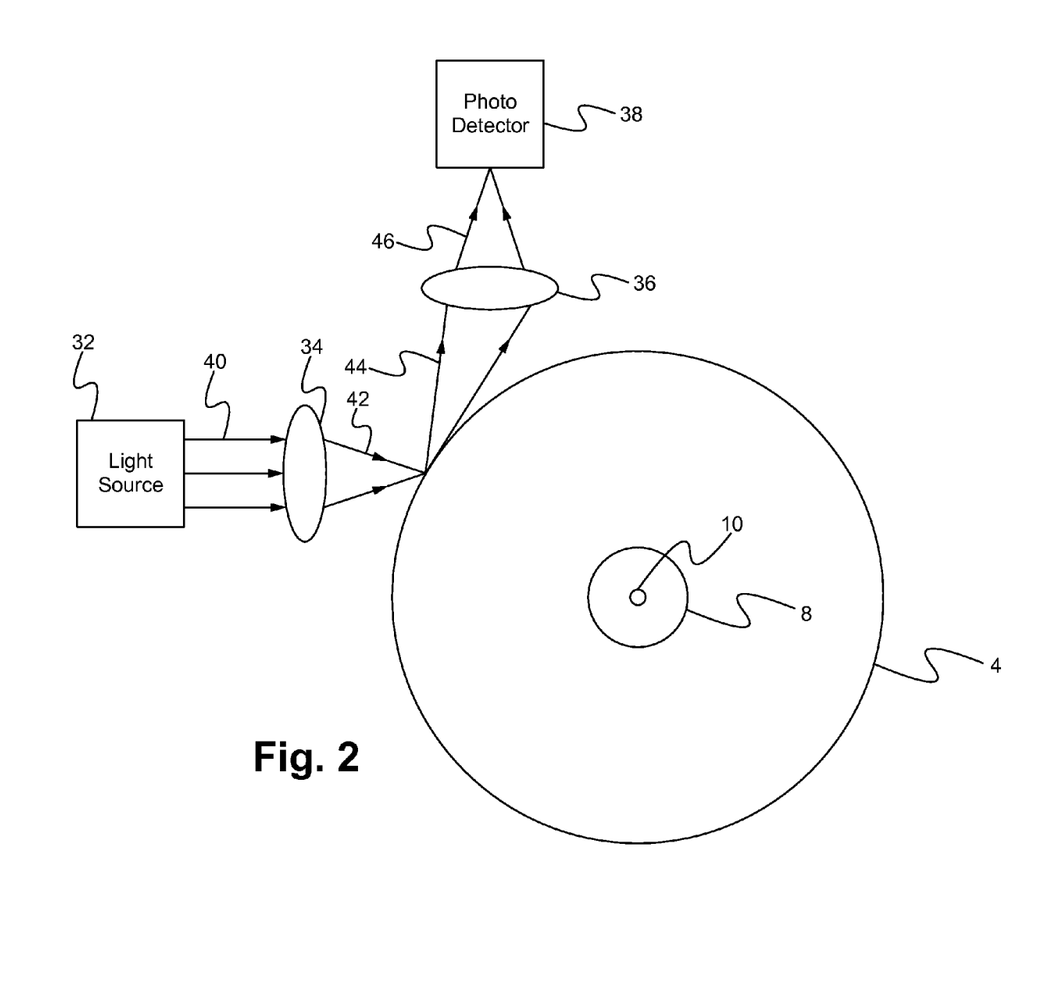
FIG. 2 illustrates a conceptual diagram of a system using a reflective option for determining positions of optical discs in an optical disc array according to some embodiments.

In some applications, writing on the surface of the optical discs may lead to unintended effects on the transmitted light. The reflective option alleviates this effect. In the reflective option, the photo detector is positioned at an angle to the optical disc array so as to receive reflected light resulting from the light emitted by the light source impinging the optical disc array and reflecting. FIG. 2 illustrates a conceptual diagram of a system using a reflective option for determining positions of optical discs in an optical disc array according to some embodiments. The system includes a light source 32, source-side optics 34, the optical disc array 2, detector-side optics 36 and a photo detector 38. In some embodiments, the light source 32 is an LED light source. In other embodiments, the light source 32 is a laser light source. It is understood that other types of light sources can be used.

In the reflective option, the light 40 emitted from the light source 32 is focused onto the optical disc array 2 and scanned across the length of the optical disc array (parallel to the cylindrical axis 10) by moving the light source/photo detector pair parallel to the cylindrical axis 10 as described above. In this case, the photo detector 38 is positioned at a reflection angle relative to the edge of the optical discs 4 and the light source 32. The optimal reflection angle is a function of the curvature of the optical disc 4 and the angle of incidence of the light 42 impinging the edge of the optical disc 4. The light source 32 emits light 40 which is received by the source-side optics 34 and directed as light 42 onto the optical disc array 2. In some embodiments, the source-side optics 34 focus the received light 40 as focused light 42, such as a narrow line of light that is parallel to a diameter of each optical disc 4. Although source-side optics 34 are shown in FIG. 2 as a single component, it is understood that the source-side optics 34 can include multiple optical components. As described in greater detail below in regard to FIG. 6, the light source 32 and the source-side optics 34 are configured to move parallel to the cylindrical axis 10 thereby scanning the light 42 along a length of the optical disc array 2. The light 42 impinges either the optical disc 4 or the gap 6 depending on the scanning location as the light source 32 and source-side optics 34 are moved. The light 42 is reflected as reflected light 44 when impinging the optical disc 4, and transmitted through a width of the optical disc array when impinging the gap 6. In practice, there is some amount of reflected light even when the light 42 impinges a gap 6 in the optical disc array 2. The photo detector 38 and the detector-side optics 36 are aligned to receive the reflected light 44 reflected off the optical disc array 2. The detector-side optics 36 focus the reflected light 44 as focused light 46 and directs the focused light 46 to the photo detector 38.

The photo detector 38 detects the reflected light from the impinging area on the optical disc array 2. Reflected light detected as having a high intensity, such as a light band in the pattern, is determined to correspond to an optical disc position, and reflected light detected having a low intensity, such as a dark band in the pattern, is determined to correspond to a space between adjacent optical discs.

FIG. 3 illustrates an exemplary configuration of the light source and photo detector for both the transmission option and the reflective option. As shown in FIG. 3, the photo detector 18 and the detector-side optics 16 used in the transmission option are offset from the cylindrical axis 10 of the optical disc array 2. As also shown in FIG. 3, the photo detector 38 and the detector-side optics 36 used int the reflective option are positioned at an exemplary reflective angle of 90 degrees, which corresponds to the Z-axis.

FIG. 3 also shows an exemplary conceptual representations of a light and dark pattern corresponding to a scanned distance d along the optical disc array 2. The beam of light impinging the optical disc array 4 represents the light 22, 42 integrated over the distance d. For the transmission option, the corresponding beam of transmitted light received by the detector-side optics 16 and the photo detector 18 represents the light 24 integrated over the distance d. For the reflective option, the corresponding beam of reflected light received by the detector-side optics 36 and the photo detector 38 represents the reflected light 44 integrated over the distance d. It is understood that the beam shapes shown in FIG. 3 are for illustrative purposes only and that in practice, the transmitted light 24 and the reflected light 44 are diverging in nature, not collimated as shown, and the transmitted light and reflected light need to be re-imaged to form the band patterns. FIG. 3 is illustrative of the conceptual light and dark band patterns formed.

Figure 4:
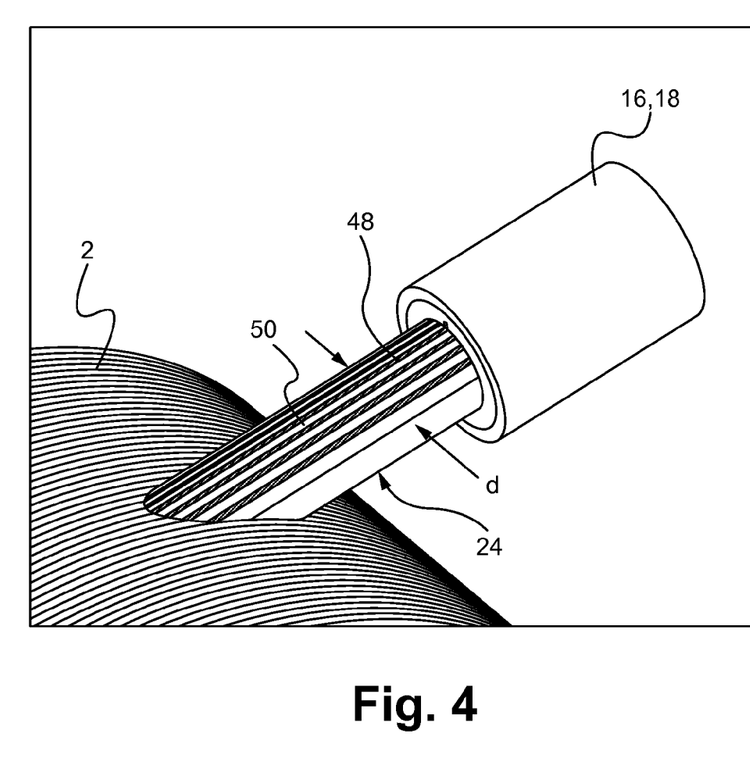
FIG. 4 illustrates an enlarged view of the detector side for the transmission option shown in FIG. 3.

FIG. 4 illustrates an enlarged view of the detector side for the transmission option shown in FIG. 3. As shown in FIG. 4, integration of the transmitted light 24 over scanning distance d results in an alternating pattern of light bands 50 and dark bands 48. The light bands 50 correspond to light that traveled through the thickness of the optical discs 4, and the dark bands 48 correspond to light that traveled between adjacent optical discs 4 in the gaps 6. The area between the optical discs has lower irradiance and the area occupied by the optical discs has higher irradiance, as detected by the photo detector.

Figure 5:
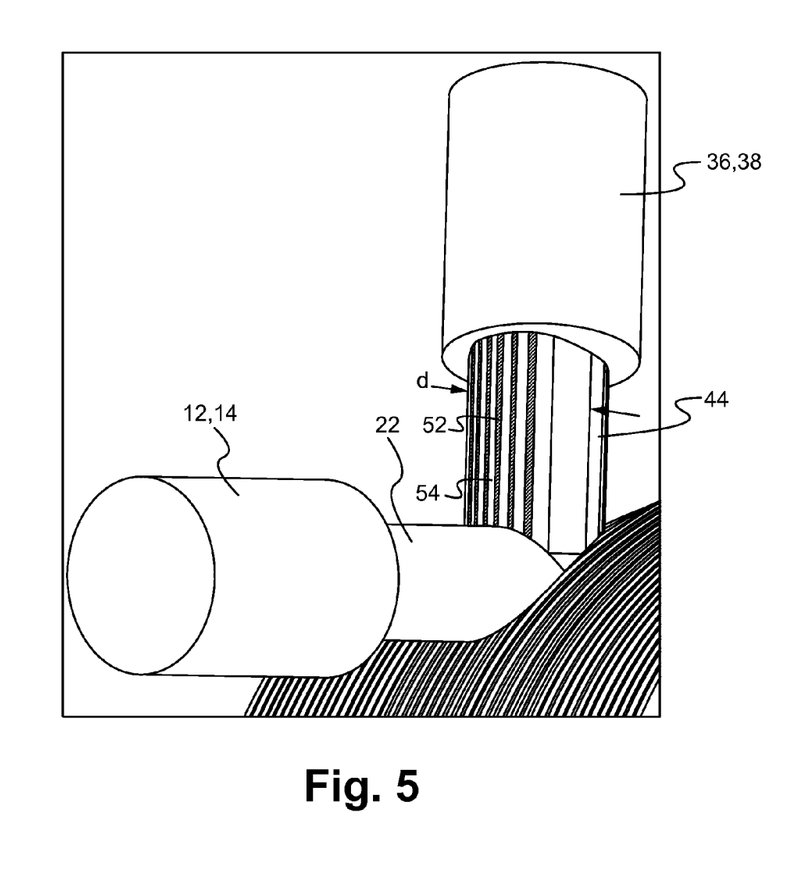
FIG. 5 illustrates an enlarged view of the detector side for the reflective option shown in FIG. 3.

FIG. 5 illustrates an enlarged view of the detector side for the reflective option shown in FIG. 3. As shown in FIG. 5, integration of the reflected light 44 over scanning distance d results in an alternating pattern of light bands 54 and dark bands 52. The light bands 54 correspond to light that reflected off the optical discs 4, and the dark bands 52 correspond to light that reflected from between adjacent optical discs 4 in the gaps 6. The area between the optical discs has lower irradiance as most of the impinging light is transmitted through the gaps, and the area occupied by the optical discs has higher irradiance, as detected by the photo detector.

Figure 6:
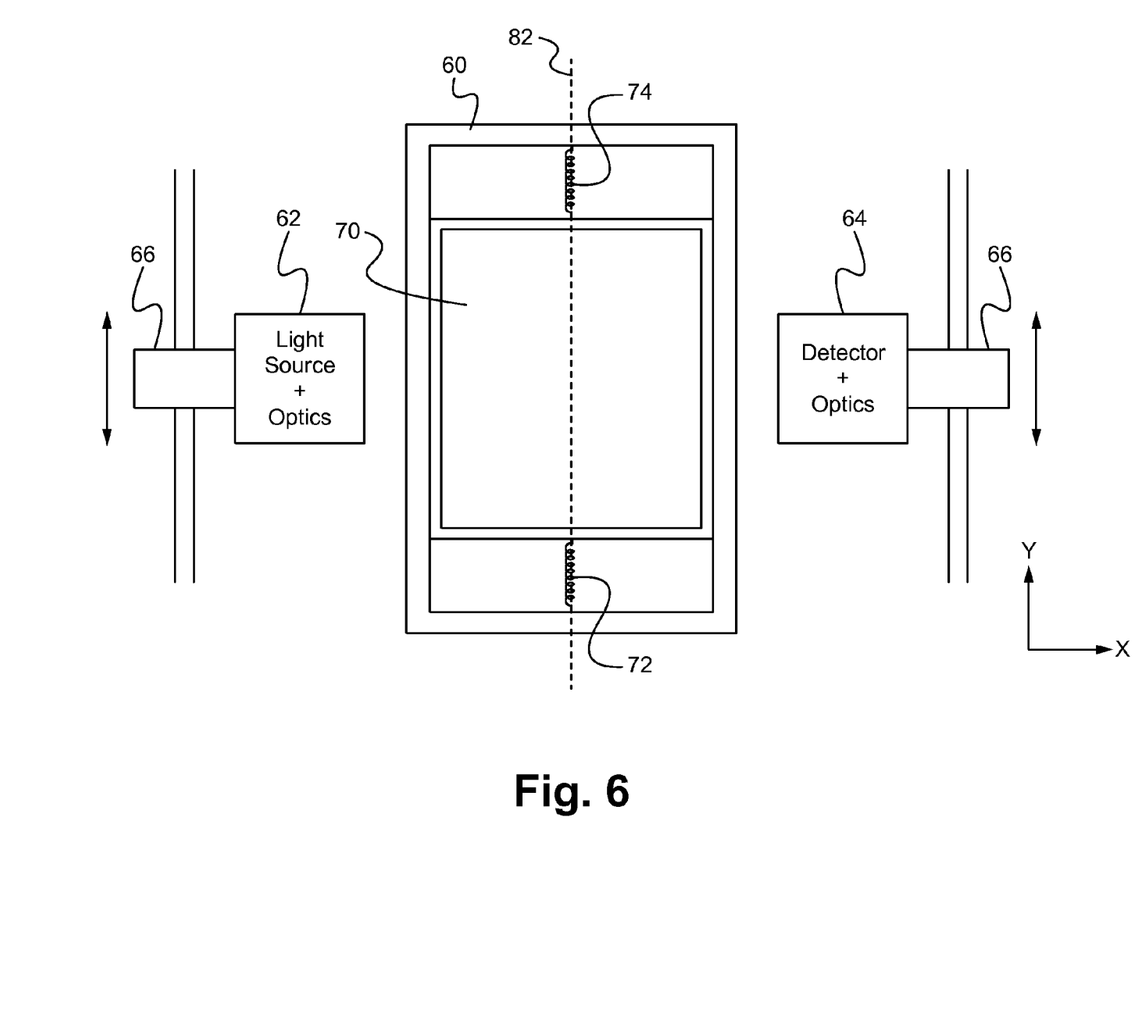
FIG. 6 illustrates a top down view of a functional system for storing an optical disc array and retrieving a specific optical disc from within the optical disc array according to some embodiments.

The light source, the source-side optics, the detector-side optics and the photo detector are connected to a common frame and movement mechanism that moves each of these components in unison so as to optically scan the optical disc array. FIG. 6 illustrates a top down view of a functional system for storing an optical disc array and retrieving a specific optical disc from within the optical disc array according to some embodiments. An optical disc array 70 is stored in a tray 60 and the optical discs of the optical disc array 70 are compressed together within the tray 60 using compression mechanisms 72 and 74. In some embodiments, the compression mechanism 72 and 74 are spring loaded. A light source/source-side optics 62 is connected to a frame and movement mechanism 66, and a photo detector/detector-side optics 64 are also connected to the frame and movement mechanism 66. To retrieve a specific optical disc in the optical disc array 70, the light source/source-side optics 62 and photo detector/detector-side optics 64 pair is moved by the frame and movement mechanism 66 in the Y direction to scan the length of the optical disc array 70. The light source/source-side optics 62 and photo detector/detector-side optics 64 pair starts at one end of the optical disc array 70 and the resulting light and/or dark bands are counted while moving toward the opposite end of the optical disc array 70 to determine the exact position of each optical disc and to find the specific optical disc according to the count. The relative position of each individual optical disc in the optical disc array 70 is previously known, for example optical disc A is known to be in the fifth position of a twenty disc array. Once the specific optical disc is located within the optical disc array 70 according to the count, the corresponding Y coordinate along the cylindrical axis 82 is noted and a robotic gripper grabs the specific optical disc using the determined Y coordinate.

In many applications, robotic grippers are not able to grab a single optical disc from within a tightly spaced, or compressed, array. In such cases, an optical disc separating means is used whereby the compression mechanism compressing the optical discs in the optical disc array is released and the optical discs are separated so as to enable a robotic gripper to grab the specific optical disc. In some embodiments, the robotic gripper is configured to perform at least three functions. A first function is to push along the positive Y direction to separate an adjacent optical disc on a first side of the specific optical disc to be retrieved. A second function is to push along the negative Y direction to separate an adjacent optical disc on a second side of the specific optical disc. A third function is to grab the specific optical disc after the adjacent optical discs have been pushed away from both sides. Once the specific optical disc is retrieved and removed from the optical disc array, the robotic gripper mechanism that pushed away the adjacent optical discs is removed and the spring loaded tray compresses the remaining optical discs. The relative positions of each remaining optical disc in the optical disc array are updated in memory.

Figure 7:
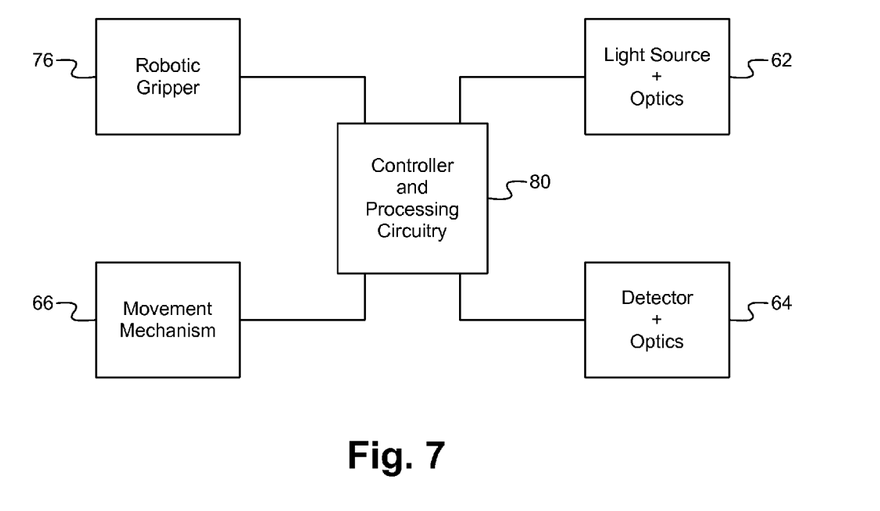
FIG. 7 illustrates a functional block diagram of a control system for controlling storage of an optical disc array and retrieval of a specific optical disc from within the optical disc array according to some embodiments.

In some embodiments, the system for storing an optical disc array and retrieving a specific optical disc from within the optical disc array is automated. FIG. 7 illustrates a functional block diagram of a control system for controlling storage of an optical disc array and retrieval of a specific optical disc from within the optical disc array according to some embodiments. The control system is configured to control the functionality previously described. As applied to the exemplary system of FIG. 6, controller and processing circuitry 80 is coupled to a robotic gripper 76, the frame and movement mechanism 66, the light source/source-side optics 62 and the photo detector/detector-side optics 64. The controller and processing circuitry 80 provides control signaling. The controller and processing circuitry 80 also includes memory, the threshold detector and the counter described above. In some embodiments, the robotic gripper 76 is of the type described above in which the robotic gripper 76 is configured to separate a specific optical disc from adjacent optical discs and to grab the specific optical disc after the adjacent optical discs have been pushed away from both sides. It is understood that the robotic gripper 76 is generally representative of a robotic mechanism for retrieving a determined specific optical disc from an optical disc array.

The present application has been described in terms of specific embodiments incorporating details to facilitate the understanding of the principles of construction and operation of the method and system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. An optical disc retrieval system comprising:
   a. a plurality of optical discs stacked together to form a cylindrical stack having a central axis, an outer perimeter side of each optical disc forms a portion of an outer surface of the cylindrical stack;
   b. a light source configured to direct light toward the outer surface of the cylindrical stack;
   c. a photo detector aligned with the light source to detect light having impinged the cylindrical stack and to output a corresponding detected signal, wherein the light source and the photo detector are configured to move together parallel to the central axis while directing light toward the cylindrical stack and detecting light such that the detected signal comprises a series of alternating high intensity value bands and low intensity value bands, each high intensity value band corresponding to a location of an optical disc in the cylindrical stack and each low intensity value band corresponding to a gap between adjacent optical discs in the cylindrical stack; and
   d. a processor coupled to the photo detector to receive the detected signal, wherein the processor is configured to count the high intensity value bands to determine a location of a specific optical disc within the cylindrical stack.

2. The system of claim 1 further comprising a movement mechanism coupled to both the light source and the photo detector, wherein the movement mechanism is configured to move the together in tandem.

3. The system of claim 1 further comprising one or more optical elements positioned between the light source and the cylindrical stack, wherein the one or more optical elements are configured to focus light output from the light source onto the cylindrical stack.

4. The system of claim 1 further comprising one or more optical elements positioned between the cylindrical stack and the photo detector, wherein the one or more optical elements are configured to focus light having impinged the cylindrical stack onto the photo detector.

5. The system of claim 4 wherein the one or more optical elements comprise a slit aperture.

6. The system of claim 1 wherein the photo detector is positioned relative to the light source such that at least a portion of the cylindrical stack is positioned between the light source and the photo detector.

7. The system of claim 6 wherein the light directed toward the cylindrical stack is transmitted through the cylindrical stack and the transmitted light is detected by the photo detector.

8. The system of claim 7 wherein transmitted light that passes through an optical disc in the cylindrical stack is detected as the high intensity value band, and transmitted light that passes through a gap between adjacent optical discs in the cylindrical stack is detected as the low intensity value band.

9. The system of claim 1 wherein the photo detector is positioned relative to the light source and the cylindrical stack such that reflected light resulting from light directed toward the cylindrical stack impinging the optical discs in the cylindrical stack is detected by the photo detector.

10. The system of claim 9 wherein reflected light that reflects off an optical disc in the cylindrical stack is detected as the high intensity value band, and light directed toward the cylindrical stack that passes through a gap in adjacent optical discs in the cylindrical stack is not reflected and is indicated as the low intensity value band detected by the photo detector.

11. The system of claim 1 wherein the light source comprises an axis of symmetry, further wherein the photo detector is aligned with the axis of symmetry of the light source.

12. The system of claim 1 wherein the light source comprises an axis of symmetry, further wherein the photo detector is aligned off the axis of symmetry of the light source.

13. The system of claim 1 further comprising a tray configured to store the array of optical discs, wherein the array of optical disc are stored in the tray on edge such that the central axis of the array forms a horizontal axis.

14. The system of claim 13 further comprising a compression mechanism coupled to the tray, wherein the compression mechanism is configured to compress the array of optical discs stored in the tray.

15. The system of claim 1 further comprising a robotic gripper configured to selectively grab the specific optical disc.

* * * * *